July 29, 1947.  W. W. HECKERT  2,424,750
METHOD AND APPARATUS FOR METERING, IN ITS BUBBLE-FREE
STATE, A BUBBLE-CONTAINING FLUID
Filed July 5, 1941  4 Sheets-Sheet 1

Winfield W. Heckert
INVENTOR
BY
ATTORNEY

July 29, 1947. W. W. HECKERT 2,424,750
METHOD AND APPARATUS FOR METERING, IN ITS BUBBLE-FREE
STATE, A BUBBLE-CONTAINING FLUID
Filed July 5, 1941 4 Sheets-Sheet 2
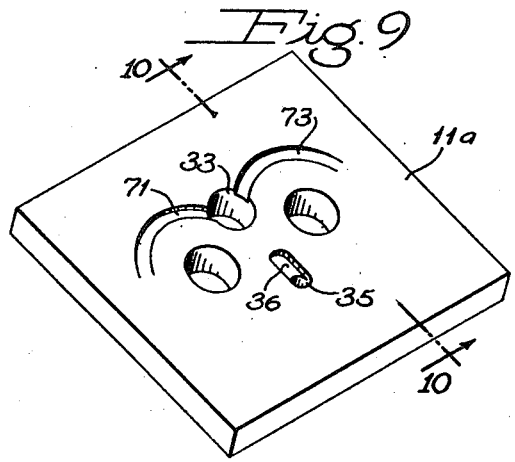
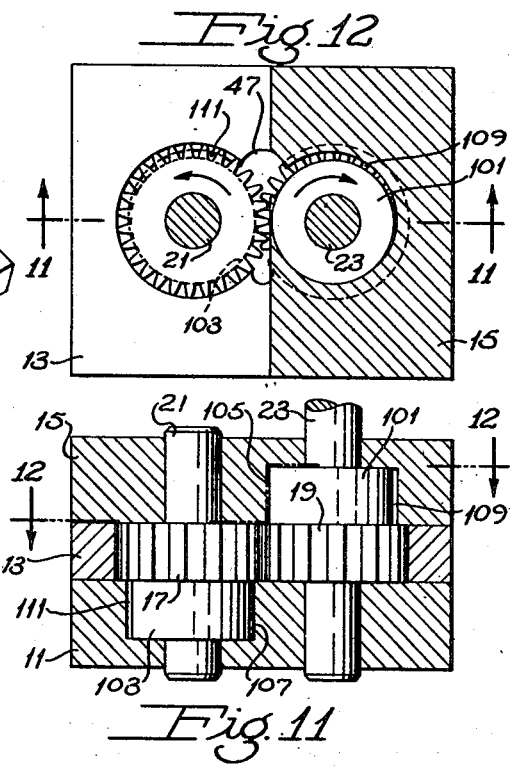
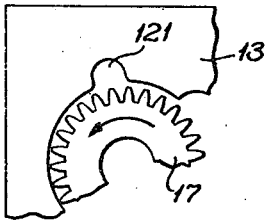
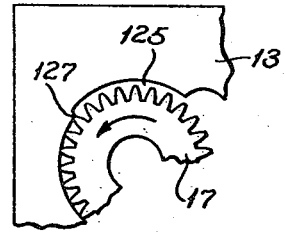
Winfield W. Heckert
INVENTOR
ATTORNEY July 29, 1947.   W. W. HECKERT   2,424,750
METHOD AND APPARATUS FOR METERING, IN ITS BUBBLE-FREE
STATE, A BUBBLE-CONTAINING FLUID
Filed July 5, 1941   4 Sheets-Sheet 3

Winfield W. Heckert
INVENTOR

BY
ATTORNEY

July 29, 1947. W. W. HECKERT 2,424,750
METHOD AND APPARATUS FOR METERING, IN ITS BUBBLE-FREE
STATE, A BUBBLE-CONTAINING FLUID
Filed July 5, 1941 4 Sheets-Sheet 4

Winfield W. Heckert
INVENTOR

BY
ATTORNEY

Patented July 29, 1947

2,424,750

UNITED STATES PATENT OFFICE 2,424,750

METHOD AND APPARATUS FOR METERING, IN ITS BUBBLE-FREE STATE, A BUBBLE-CONTAINING FLUID

Winfield Walter Heckert, Wilmington, Del., assignor to E. I. du Pont de Nemours & Company, Wilmington, Del., a corporation of Delaware Application July 5, 1941, Serial No. 401,103

18 Claims. (Cl. 103—126)

This invention relates to a new and improved method for continuously pumping and, at the same time, accurately metering a viscous liquid (a viscosity exceeding 25 poises) containing a varying proportion of bubbles. Furthermore, it relates to an improvement in precision rotary pumps of the type adapted for use in very accurately metering viscous bubble-containing liquids.

This application is a continuation-in-part of my copending application Serial No. 345,120, filed July 12, 1940.

Precision rotary pumps, and particularly precision gear pumps, have long been used in pumping and metering filament-forming compositions to spinnerets and the like in the rayon industry. Such pumps are suitable for forwarding such viscous compositions in a constant amount per unit of time with great accuracy provided that the bubbles are first removed from such compositions. Obviously, conventional gear pumps cannot meter a constant quantity of composition if the latter contains bubbles in varying proportions.

In the spinning of artificial filaments and the like from molten organic filament-forming compositions such as nylon (the synthetic linear polyamides disclosed in Carothers U. S. Patent No. 2,130,948) and similar compositions, great difficulty has been encountered in removing bubbles from the compositions. A great many of the known organic filament-forming compositions, in their molten state, are subject to constant bubble formation, due largely to decomposition.

In the copending application of George DeWitt Graves, Serial No. 232,314, filed September 29, 1938, now issued as Patent No. 2,278,875, dated April 7, 1942, there is disclosed a method of producing continuous structures, such as filaments, yarns, ribbons and the like of a very uniform denier or gauge, from compositions subject to bubble formation, by a process wherein the film- or filament-forming composition is first subjected to sufficient pressure to dissolve the bubbles in the composition, and then this bubble-free melt is metered, while being maintained under pressure, to an extrusion device such as a spinneret. This can be accomplished, for example, by the use of two pumps connected in series, the first subjecting the film- or filament-forming composition to pressure and delivering the bubble-free composition so produced to a second pump, which meters the bubble-free composition to a suitable extrusion device.

Two pumps will function to meter a substantially bubble-free composition to the extrusion device but their use presents mechanical problems, especially at the high temperatures involved in melt extrusion. Pump wear, maintenance, provisions for synchronous drives, etc., make them expensive and tend to make the extrusion apparatus cumbersome. Likewise, the two pumps increase the amount of film- or filament-forming composition which must be maintained in the molten state and hence prolong its exposure to conditions promoting decomposition.

It is, therefore, an object of this invention to provide an improved method and apparatus for the production of structures from film- or filament-forming compositions which contain bubbles under the conditions of extrusion.

It is another object of this invention to provide an improved method and apparatus for the elimination of bubbles from film- and filament-forming compositions and for metering the resulting bubble-free compositions to a structure-forming device.

Other objects of this invention will appear hereinafter.

The objects of this invention may be accomplished, in general, by subjecting a filament-forming composition which contains bubbles to frictional drag of sufficient force to press said bubbles into solution, and then forwarding the bubble-free composition at a constant volume per unit of time to a structure-forming device. This may be carried out, in accordance with the present invention, in a precision rotary pump which is provided, between the inlet and outlet openings, with a frictional drag passage in which the composition is subject to a gradually increasing pressure due to frictional drag whereby to materially reduce, or eliminate the bubbles from the composition before the pump teeth make sufficient contact with the surrounding elements to meter the composition in a positive manner. By the use of a pump constructed in this fashion, the composition metered to the outlet opening will be bubble-free and it will completely fill the space between the gear teeth and the elements surrounding said teeth, and thereby the composition will be forwarded in a constant volume per unit of time.

The invention will be more easily understood by reference to the following detailed description when taken in connection with the accompanying illustrations, in which.

Figure 6:
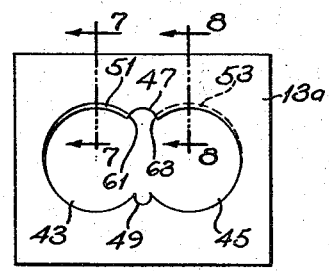
Figure 6 is an elevational view of a modified form of center plate.
Figures 7, 8:
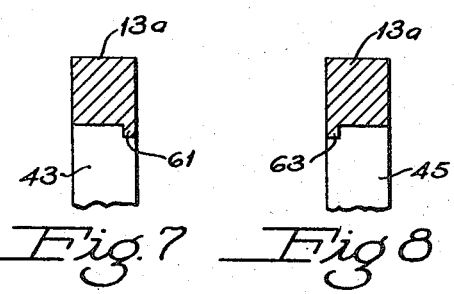

Figures 7 and 8 are detailed views taken respectively along the lines 7—7 and 8—8 of Figure 6.

Figure 9 is a perspective view of a modified form of rear side plate constructed in accordance with the present invention.

Figure 10 is a cross-sectional view taken along the line 10—10 of Figure 9, and showing the position of a gear thereon.

Figure 11 is a cross-sectional view of a modified form of rotary pump constructed in accordance with this invention.

Figure 12 is a partially elevational and partially cross-sectional view taken along the line 12—12 of Figure 11.

Figure 13 is a diagrammatic elevational view of sections of a modified center plate and gear in which an enlarged chamber is inserted in the bubble-dissolving passage for the purpose of storing the liquid and applying pressure to it.

Figure 1:
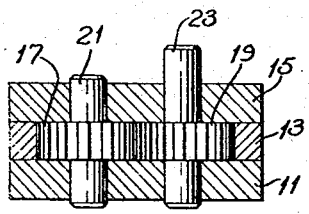
Figure 1 is a cross-sectional view on the plane of the axis of the gears of a gear pump having frictional drag clearances constructed in accordance with this invention.
Figure 2:
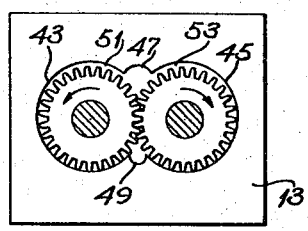
Figure 2 is an elevational view of the center plate and gears of the pump shown in Figure 1.
Figure 3:
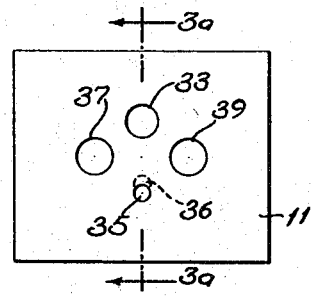
Figure 3 is an elevational view of the outside face of the rear side plate of the pump shown in Figure 1.
Figure 4:
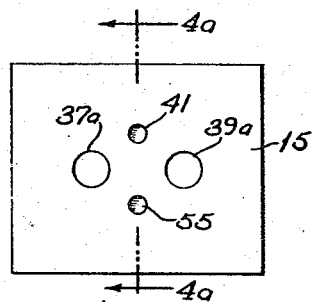
Figure 4 is an elevational view of the inside face of the front side plate of the pump shown in Figure 1.
Figure 5:
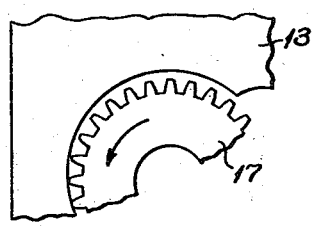
Figure 5 is a diagrammatic elevational view of sections of a center plate and gear.

Figure 14 is a diagrammatic elevational view of sections of a center plate and gear, similar to Figure 5, in which the peripheral passage is of uniform depth.

Figure 15:
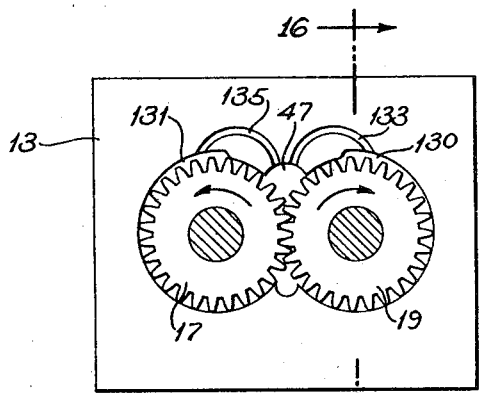

Figure 15 is a side elevational view of another modified form of center plate showing gears in position.

Figure 16:
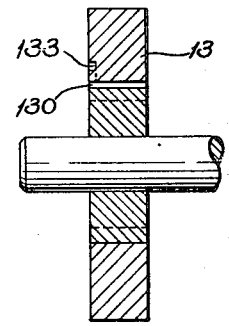

Figure 16 is a sectional view taken along the line 16—16 of Figure 15.

Figure 17:
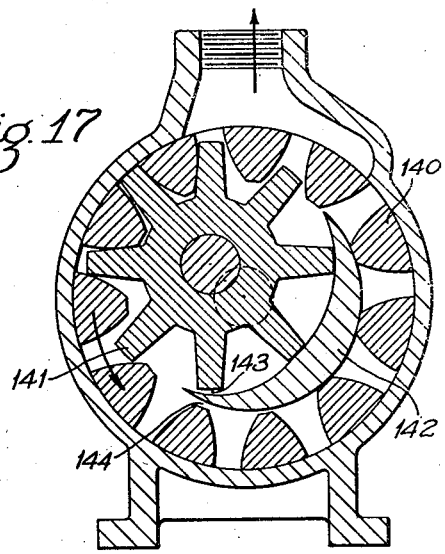

Figure 17 is a cross-sectional view through an internal gear rotary pump constructed with frictional drag passages in accordance with this invention.

Figure 18:
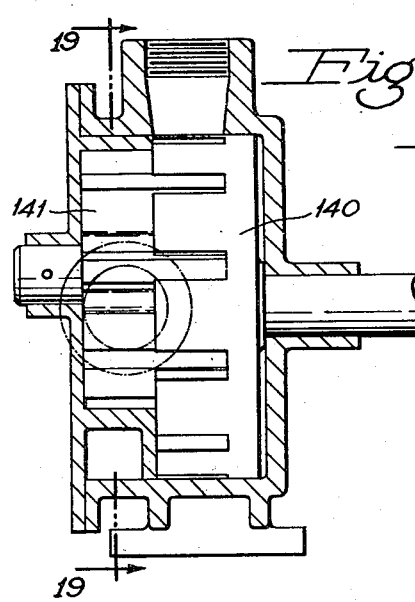

Figure 18 is a cross-sectional view through the casing of the pump shown in Figure 17 taken substantially at a right angle to Figure 17.

Figure 19:
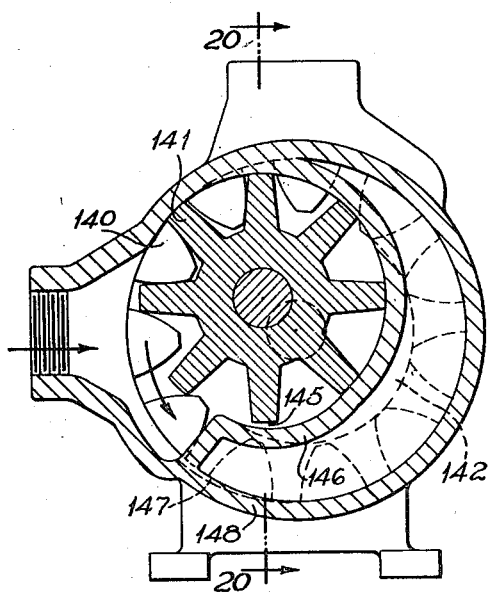

Figure 19 is a cross-sectional view taken along the line 19—19 of Figure 18.

Figure 20:
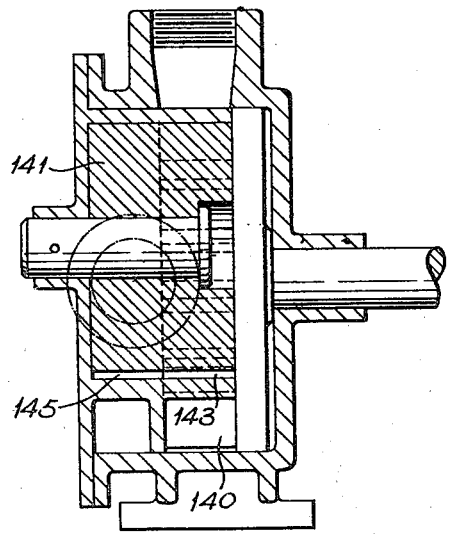

Figure 20 is a cross-sectional view taken along the line 20—20 of Figure 19.

Figure 21:
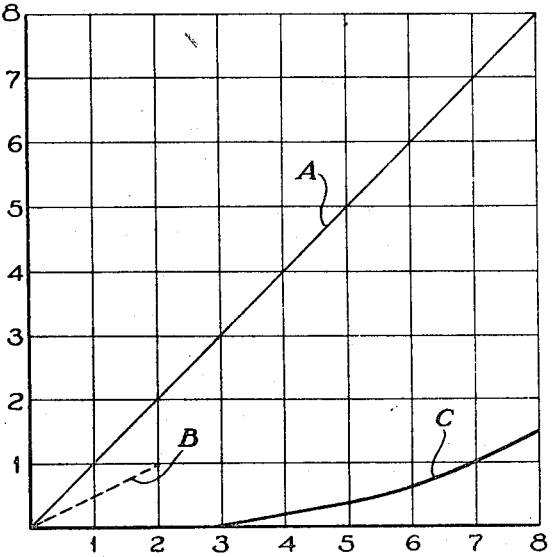

Figure 21 is a graphic representation of the bubble-dissolving capacities of the pumps of the present invention compared to previously known gear pumps.

Referring to Figures 1 to 5 of the drawings, reference numeral 11 designates the rear side plate of the gear pump and numerals 13 and 15 designate, respectively, the center plate and front side plate of the gear pump. The three plates are held together by means of suitable bolts or screws (not shown). A pair of meshing gears 17 and 19 are operatively positioned within circular openings of the center plate 13 and between side plates 11 and 15. (The meshing gears may be housed within a plate which serves the purpose of both a center plate and one side plate, thus producing a pump having only two plates.) The gears 17 and 18 are mounted respectively on drive shafts 21 and 23. The gear drive shafts 21 and 23 are journaled in the side plates 11 and 15, the shaft 21 being positioned in openings 37 and 37a, respectively, of the rear and front plates, and shaft 23 being positioned in openings 39 and 39a, respectively, of said rear and front plates.

The rear side plate 11, as above indicated, is provided with openings 37 and 39 in which the gear shafts are journaled. Plate 11 is also provided with an inlet opening 33 and an outlet opening 35, for the liquid. A shallow depression 36 extending from the opening 35 functions as a pressure relief clearance for liquid entrapped between meshing gear teeth. The front side plate 15 is provided with gear shaft journal openings 37a and 39a, and is also provided with a small circular depression 41 which will function as a vacuum relief groove to relieve any vacuum created by the unmeshing of the gear teeth. The front side plate may also be provided with a small circular depression 55 which will function as a pressure relief groove, similar to depression 36 in the rear side plate, to allow any liquid caught between the teeth as they mesh to escape to the recessed space 49 of the center plate.

The center plate 13 contains two generally circular openings 43 and 45 into which the gears 17 and 19 fit for the purpose of propelling a liquid from the inlet to the outlet openings. The center plate is also provided with enlarged recessed spaces 47 and 49 which connect with the inlet opening 33 and the outlet opening 35 of the rear side plate. The recessed spaces 47 and 49 serve as liquid conveying openings for passage of the liquid to and from the gears. From the recessed inlet opening 47 to a point midway between openings 47 and 49, the center plate is provided with wedge-shaped passages 51 and 53 which exceed the necessary clearance between the gear teeth and the center plate. The liquid flowing into opening 47 will, therefore, be forced into the wedge-shaped passages 51 and 53 by a frictional drag thereon rather than a positive propulsion between the teeth and the peripheral surface of the center plate. As set forth more in detail hereinafter these wedge-shaped passages must have certain critical dimensions to exert sufficient frictional drag on the liquid to dissolve bubbles before the liquid is forwarded in a positive manner. From a point more or less midway between inlet opening 47 and outlet opening 49 about each gear to the outlet opening 49, the openings 43 and 45 in the center plate have a radius approximately the same as the addendum circle of the gear teeth. There will be just sufficient clearance between the gear teeth and the center plate at these sections to permit free rotation of the gears and thus forward the liquid in a positive manner.

The operation of the pump, above described, is substantially as follows: The liquid to be pumped enters through the inlet opening 33 in the rear side plate and passes to the inlet opening 47 in the center plate. The gears, rotating in the direction of the arrows shown in Figure 2, frictionally drag the liquid into the wedge-shaped passages 51 and 53. The wedge-shaped passages gradually diminish in cross-sectional area in the direction of rotation of the gears. The shape and size of these openings are critical as will be more fully shown below. The bubbles which may be present in the liquid are placed under a gradually increasing pressure by frictional drag thereon which will readily dissolve the same in the liquid. At a point more or less mid-way between the inlet and outlet openings in the center plate, the gear teeth of the gear wheels will be in substantial communication with the peripheral surface of the surrounding center plate and will uniformly meter the now bubble-free liquid to the outlet openings 49 and 35.

Figures 6, 7 and 8 of the drawings illustrate a modified form of center plate for use in a gear pump of the present invention. In this modification, the center plate 13a adjacent the wedge-shaped passages is provided with flanges 61 and 63. The flange 61 is positioned along one face of the center plate, and the flange 63 is positioned along the opposite face of the center plate. The internal periphery of the flanges 61 and 63 will be constructed on a radius substantially the same as the radius of the addendum circle of the gears. By the provision of flanges of this type, gears will be more accurately centered in the center plate. Furthermore, this modification has the advantage of lessening the possibility of damage to the pump during assembly or disassembly. The operation of a pump constructed with this modification of center plate will be substantially the same as outlined above.

Figure 3A:
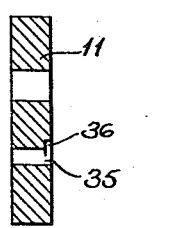
Figure 3a is a sectional view taken along the line 3a—3a of Figure 3.
Figure 4A:
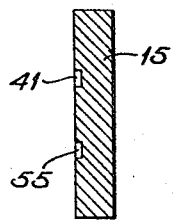
Figure 4a is a sectional view taken along the line 4a—4a of Figure 4.

Figures 9 and 10 of the drawings illustrate a modified form of rear side plate having wedge-shaped side passages in communication with the teeth of the gears. In this modification, wedge-shaped passages 71 and 73 are provided in one, or both, of the side plates alongside of the gear teeth and in communication with the inlet opening 33 so that the liquid in the passages and between the gear teeth is placed under a gradually increasing pressure in much the same manner as in the case of peripheral passages above described. The broken line 75 in Figure 10 represents an extension of the side passage around the arc of the wedge-shaped passage to the point where the depth of the passage substantially becomes zero. Similar side passages may also be provided in the front side plate. In Figure 9, outlet 35 is shown provided with an extension in the form of a depression 36 which, as in Figures 3 and 3a, serves as a pressure relief groove.

Figures 11 and 12 of the drawings illustrate a modified type of gear pump in which the frictional drag on the liquid takes place between the peripheral surfaces of rotating cylinders 101 and 103, which extend from the gears, and the surrounding surfaces of the wedge-shaped passages 109 and 111. The side plates 15 and 11 are provided with recesses 105 and 107 in which cylinders 101 and 103 are positioned. The rotating cylinders 101 and 103 are extensions of and rotate respectively with gears 19 and 17. The recesses 105 and 107 provide for wedge-shaped passages 109 and 111 between the peripheral surfaces of the cylinders and the adjacent surfaces of the said recesses. The wedge-shaped passages must, of course, communicate with both the inlet opening 33 and the spaces between the teeth of the gears. The diameters of rotating cylinders 101 and 103 are preferably approximately the same as the diameters of gears 17 and 19 measured from points at the bottom of the spaces between the gear teeth or slightly greater diameter but less than the diameter of the gears measured from points on the outer surfaces of the gear teeth. Thus, the wedge-shaped passages always communicate with the spaces between the gear teeth and the liquid is squeezed, to a substantially bubble-free state, before it is forwarded by the gear teeth in a positive manner.

Figure 13 illustrates a modified form of peripheral wedge-shaped passage having a storage chamber 121 in which the liquid is placed under pressure brought about by the frictional drag on the liquid in the more shallow parts of the passage. This chamber may be of a wide variety of shapes and sizes. The essential requirement is that there be at least a critical length and depth of the wedge-shaped passage within the ranges more particularly set forth hereinafter. This critical length of the passage may be in the part of the passage coming either before or after the storage chamber, or it may be a summation of lengths of passages both before and after the storage chamber.

In the several modifications above-described, the frictional drag passages referred to were all of a wedge-shaped configuration. Such frictional drag passages can, however, be of uniform depth if they comply with the critical dimensions set forth below.

Figure 14 shows a peripheral passage in which the liquid is subjected to a frictional drag to eliminate bubbles, and the resulting bubble-free liquid then forwarded in a positive manner. In this modification, the center plate 13 is provided with a peripheral passage 125 of constant depth to the point 127 where the gear teeth make substantial contact with the peripheral surface. The passage 125 must, of course, be sufficiently long and sufficiently shallow to impart a frictional drag to the liquid which is of sufficient magnitude to dissolve the bubbles in the liquid.

Referring to Figures 15 and 16 of the drawings, the wedge-shaped passages 130 and 131 are not in direct connection with inlet opening 47 but are connected thereto by means of grooves 133 and 135. This modification of the invention illustrates that it is only necessary that the wedge-shaped frictional drag passages be in communication, whether directly or indirectly, with the liquid in the inlet opening 47.

Figures 17, 18, 19 and 20 illustrate a conventional form of internal gear rotary pump comprising the external gear 140, the internal gear 141 and fixed spacer 142. Frictional drag passages may be provided in this type of gear pump as well as in the type of gear pump above-described. The spacer 142 may be cut away as shown in Figure 17 to provide frictional drag passages 143 and 144. A similar frictional drag passage 145 may be provided between the teeth of the internal gear 141 and the auxiliary casing 146 (see Figure 19). A frictional drag passage 147 may also be provided between the periphery of external gear 140 and the primary casing 148 as shown in Figure 19. This invention is applicable to any type of rotary pump, for example, the Root type of rotary pump employing as low as two gear teeth.

Referring to Figure 21, line A represents the bubble-dissolving capacity of gear pumps previously known in the art. Line B represents the bubble-dissolving capacity of an acceptable gear pump in accordance with the principles of the present invention. Line C represents the bubble-dissolving capacity of the preferred pump construction shown in Figures 1 to 3 and described in Example I below.

The following detailed examples are submitted to illustrate the process and operation of the apparatus of the present invention with special reference to molten polyhexamethylene adipamide, a synthetic linear polyamide, obtainable from the reaction of hexamethylene diamine with adipic acid. It is to be understood, of course, that the invention is not to be limited to the details set forth in these examples.

EXAMPLE I

Polyhexamethylene adipamide chips (melt viscosity 700 poises at 285° C.) (melting point about 263° C.) were melted down in a nitrogen atmosphere under 20 pounds gauge pressure by means of a heated grid as is customary in this art. A pool of molten polymer containing bubbles, caused both by entrainment of nitrogen in the melting operation and by decomposition, formed below the melting grid. The polymer then passed from this pool through a passage to the inlet port of a pump constructed in accordance with Figures 1 to 5. The pump was provided with a peripheral wedge-shaped frictional drag passage which had a maximum depth of 0.0145 inch and a length of .97 inch. The diameter of the gears was 0.9895 inch and the thickness 0.3953 inch. The pump had a capacity of 1.12 grams per revolution. The pump operated in the manner described above, dissolved the bubbles and accurately metered substantially bubble-free polymer to the outlet port as shown in Table I:

Table I

| Bubble Content of Melt Fed to Pump in Per Cent | Bubble Content of Melt Delivered by Pump in Per Cent | Per Cent Reduction of Bubble Content |
|---|---|---|
| 0 | 0 | |
| 1 | 0 | 100 |
| 2 | 0 | 100 |
| 4 | 0.2 | 95 |
| 6 | 0.75 | 87.5 |
| 8 | 1.5 | 81 |

From this port, the polymer was forced through a filter and pressure-controlling pack containing layers of carefully elutriated sand of decreasing particle size in the direction of flow and screens of varying mesh sizes. This pack, which is well-known in the art, not only serves to remove foreign particles from the melt, but also to maintain the pressure imposed on the melt by the pump at a sufficiently high level to prevent the dissolved bubbles from reappearing. The molten material was then forced from this pack, through a spinneret, drawn off and collected in the form of multifilament yarn. This yarn was found to have a constant denier such that when denier measurements were made, they showed a standard deviation of approximately ±1% thus showing the extremely accurate metering character of such a pump. The denier measurements above referred to were made on 9-meter lengths of yarn.

Pumps similar to the above-described pump but having wedge-shaped passage lengths as short as 0.25 of an inch are also acceptable. An acceptable pump for a given liquid is one which when fed a liquid having a bubble content of 2% reduces the bubble content to 1% or less and which when fed a liquid having a bubble content of less than 2% reduces the bubble content at least 50%.

Bubble content of the material delivered by the pump is defined as the per cent loss in the metering efficiency of the pump caused by the presence of bubbles in the fluid. Metering efficiency of a pump is the ratio of actual delivery to theoretical delivery expressed in per cent. The theoretical delivery of a pump is the delivery of a pump supplied with bubble-free liquid. The theoretical delivery can be obtained by suddenly raising the pressure on the liquid from 5 to 50 pounds per square inch to collapse all bubbles present, and immediately determining the delivery for 50 revolutions of the pump. The bubble content of the liquid fed to the pump is the per cent loss in metering efficiency observed when a gear pump without bubble-dissolving passages is used to pump it.

The frictional drag passage in pumps of the present invention may have different maximum depths and the length of the passage required will accordingly be different. In general, it is found that frictional drag passages whether they are wedge-shaped or of uniform depth, having one or more sections totaling at least 0.25 of an inch in length and having a depth of at least 0.002 of an inch and not more than 0.04 of an inch will produce acceptable results. The upper limit of length is, of course, the maximum obtainable length which still permits maintaining a satisfactory seal between the teeth and the surrounding elements for the forwarding of liquid in a positive manner. With gear pumps in which the gear diameter is approximately 1 inch, it is possible to operate without difficulty with only 0.25 inch of seal as measured on the circumference, which represents only 3 gear teeth acting as sealing members. As the gear diameters are increased, the passages can be lengthened, and since additional length aids in the bubble elimination, this would be desirable. In general, a gear pump having a gear diameter of over 6 inches would be awkward and unsuitable for incorporation into a spinning machine; however, even for such large gear pumps, the above-stated critical limitations can be applied to determine whether the pump represents an acceptable bubble-dissolving passage system. The critical dimensions of the frictional drag passages apply equally to such passages which are arranged to cooperate with cylindrical extensions of the gear teeth as shown in Figures 11 and 12. In the latter modification of the invention, the cylinders and gears are actually integral rotating members in which one part functions to impart pressure by frictional drag and the other part functions to propel the liquid in a positive manner.

The width of the wedge-shaped peripheral passages is preferably that of the gear since maximum efficiency of the squeeze mechanism is obtained by utilizing the maximum area of passage in contact with the gear surfaces having the greatest surface speeds. However, it is not precluded to make the width of the passages some fractional part of the width of the gear and to adjust the depth and length of the passage so as to produce an acceptable pump. It is generally undesirable to make the width of the passage exceed the gear width for the entire length of the passage since the efficiency of the pump would be impaired.

When wedge-shaped side passages, such as shown in Figures 9 and 10 are employed the dimensions of such passages should be, in general, the same as peripheral passages. Preferably, the side passages will be constructed of a width substantially equal to the height of the gear teeth; however, they may be somewhat wider at the inlet end thereof and decreasing in width as the depth of the passage decreases until the width becomes equal to the height of the gear teeth at the point where the depth of the passage becomes zero.

Various combinations of the above-described peripheral passages and side passages can be incorporated into a pump. For example, there may be one or more peripheral wedge-shaped passages and one or more side wedge-shaped passages. Other arrangements are possible so long as any or all of the passages have one or more sections of lengths totaling at least 0.25 of an inch with a depth of at least 0.002 of an inch and not more than 0.04 of an inch. It is necessary for these sections to communicate with the inlet port through passages having a minimum depth of 0.002 of an inch and to communicate with the gear teeth at some point between the inlet and the outlet ports.

It is to be understood that the above-described limitation to frictional drag passages having sections of lengths totaling at least 0.25 of an inch with a depth of at least 0.002 of an inch and not more than 0.04 of an inch does not preclude the possibility of having openings to the passages greater than 0.04 of an inch. The passage depth is the distance from the gear to the bottom of the passage measured at right angles to the gear. Thus, the depth of a peripheral passage is measured along an extended radius of the moving member, and the depth of a side passage is measured at right angles to the side of the moving member.

EXAMPLE II

This example illustrates the utility of the pumps of this invention in metering low viscosity bubble-containing liquids.

A viscose solution having a viscosity of about 40 poises was metered to a spinneret by means of a pump such as that described in Example I. Varying amounts of bubbles had previously been incorporated into the viscose by means of an electric mixer. Table II shows that the pump operated efficiently to reduce the percentage of bubbles in the viscose spinning solution.

Table II

| Per Cent Bubble Content of Viscose | Per Cent Bubble Content of Viscose Delivered by Pump | Per Cent Reduction of Bubble Content |
|---|---|---|
| 0 | 0 | |
| 0.25 | 0.04 | 84 |
| 0.5 | 0.12 | 76 |
| 0.75 | 0.25 | 67 |
| 1.0 | 0.48 | 52 |

It is seen from Example II that a low viscosity liquid, such as viscose spinning solution, may be beneficially metered by means of the pump of the present invention. The bubbles in the viscose were air artificially introduced by rapid beating. The pump operated acceptably on this type of low viscosity liquid to reduce bubbles. Such a pump is useful in reducing the time required for evacuation of viscose by reason of eliminating the last few bubbles.

EXAMPLE III

A 20% cellulose acetate solution in acetone having a viscosity of about 100 poises was stirred with an electric mixer to introduce varying amounts of bubbles into the dope and the bubble-containing dope was metered to a spinneret by means of a pump such described in Example I. Table III shows that the pump efficiently operated to reduce the bubbles in the dope.

Table III

| Per Cent Bubble Content of Dope | Per Cent Bubble Content of Dope Delivered by Pump | Per Cent Reduction of Bubble Content |
|---|---|---|
| 0 | 0 | |
| 2 | 0 | 100 |
| 4 | 0 | 100 |
| 6 | 0.24 | 96 |
| 8 | 0.5 | 94 |
| 10 | 0.75 | 92.5 |

The pumps of this invention will operate efficiently with liquids, for example, solutions or melts of filament-forming compositions, of 25 poise viscosity or greater. In general, for the pumping of melts, the bubble-dissolving action is more efficient for the higher viscosity melts. Three thousand poise, or still higher viscosity, melts of nylon (synthetic linear polyamides disclosed in Carothers U. S. Patent No. 2,130,948) can be readily metered by means of these pumps. The only limitation as to maximum viscosity is that the liquid be able to flow into the pump.

For extrusion of film- or filament-forming compositions at high temperatures and especially where the composition is of a corrosive nature at these temperatures, as in the melt extrusion of polymeric materials, such as synthetic linear polyamides, the choice of a suitable material of construction for these pumps becomes of considerable importance. For these purposes, it has been found that the essential characteristics are resistance to corrosion, resistance to abrasion and galling, together with low thermal expansion characteristics after the parts that go to make up the pump have been heat-treated. It is concluded that this combination of properties can best be attained by using steels containing in the range of 10% to 16% chromium, 1.0% to 1.6% carbon, together with other elements which may be added, such as cobalt, vanadium and molybdenum. These latter elements in total should not exceed 4%.

It is recognized as being desirable to employ a heat treatment on the machined parts such that any tendency to distort or warp in service, thereby causing binding or leakage, be minimized. This relative freedom from distortion in service may be accomplished by rapid cooling from the hardening temperature by immersion in oil, which cooling is followed at once by a drawing operation in the upper temperature range of the 600° F. to 1000° F. interval, with approximately 750° F. preferred.

An example of a preferred steel alloy as a material of construction for the pump of this invention is one containing 1.55% carbon, 12% chromium, 0.40% cobalt, 0.20% manganese, 0.35% silicon, 0.85% vanadium, 0.80% molybdenum and 83.85% iron. To provide the proper hardness necessary to undergo the drastic conditions of melt extrusion, this alloy should be quenched in oil in the temperature range between 1750° F. and 1850° F. and drawn in the temperature range between 600° F. and 1000° F., giving a hardness of 55 to 65 Rockwell C and an annealed hardness of greater than 212 Brinell. This steel may be purchased under the trade name of "O-Hi-O Air Die" steel.

Although the pumps of this invention are especially adapted for the melt spinning of nylon, it is obviously applicable to the spinning of any organic filament-forming composition, which contains bubbles or is subject to the formation of bubbles, for any reason, under the conditions just prior to and during the spinning thereof provided the gases redissolve under pressure and any decomposition is slow enough to permit metering before sufficient gases are formed to exceed the solubility under the conditions of temperature and pressure adopted for the spinning operation. As examples of such filament-forming compositions in which bubble formation may be present, the following may be mentioned: synthetic linear polyamides, that is, synthetic linear polymers containing —CONH— units in the linear chain; synthetic linear polymers such as polyesters, polyethers, polyacetals and mixed polyester-polyamides such as may be prepared by condensation reactions as described in U. S. Patent No. 2,071,250 may also present problems of bubble formation which can be remedied by the process of the present invention. Other types of synthetic polymers such as ethylene polymers, vinyl polymers, polystyrene and polyacrylic acid derivatives may also be spun with advantage by utilizing the process and apparatus of the present invention. The pumps of this invention may also be used to advantage in the spinning or extrusion of other types of filament-forming solutions, for example, cellulosic solutions such as viscose or cuprammonium cellulose, or cellulose derivative solutions such as cellulose acetate, when gas bubbles present a problem. Also, these solutions may be metered advantageously by these pumps if they contain bubbles caused by the presence of modifying agents or from any other cause.

Although the pumps of this invention have been described with reference to the extrusion of film- or filament-forming compositions, they are also applicable to the metering of bubble-free compositions in the spinning of bristles and the coating of wire, etc.

These pumps also find application in the pumping of liquids at or near their boiling points so that liquid only is metered without the presence of gases. In this connection, these pumps have utility as dispensing devices. These pumps may also be used to meter liquids undergoing decomposition with the evolution of gases.

In the above description, reference has repeatedly been made to "precision" pumps. The pumps to which the present invention is applicable are pumps in which the dimensional tolerances are very small. Such precision pumps are made by techniques similar to watch-making or instrument-making techniques with dimensional tolerances held to limits as small as ±0.00005 inch (5 one hundred thousandths of an inch). Operating clearances specified for synthetic linear polyamide pumps of this type are (0.00075 inch × 0.0015 inch) and for viscose pumps (0.0002 inch × 0.0002 inch). The first value in the parenthesis is the difference between the center plate thickness and the gear width or thickness. The second value in the parenthesis is the difference between the diameter of the cavity of the center plate and the outside diameter of the gear. Side clearances and radial clearances are only one-half the above-stated values. The term "precision" pump, as used herein, therefore refers to the above-described type of pump.

Although the above-discussed factors are of primary importance in influencing the efficiency of a pump of the type described herein, other factors also play a part. These other factors include solubility of gas, amount of gas dissolved before introducing the material to the pump, temperature of the material, temperature rise in the pump passage and the speed at which the pump is operated. Obviously, the gas must dissolve in the material if the bubble-dissolving mechanism described herein is to function. If the material is saturated with the gas before entering the pump, the squeeze mechanism must develop enough pressure to permit the gas in the bubbles to be dissolved. A temperature rise in the pump would probably decrease solubility of the gas. Apparently, the effectiveness of the frictional drag passages to dissolve bubbles is a function of the relative surface speeds of the gear and the bottom of the frictional drag passage. However, within the usual operating range of approximately 10 to 20 revolutions per minute for the spinning of synthetic linear polyamides from melt, there is no appreciable effect of speed.

By the practice of this invention, it is possible to produce structures of very uniform properties particularly yarns of very uniform denier from filament-forming compositions containing bubbles or having a tendency to form bubbles during the extrusion thereof. This is accomplished by a simple, inexpensive and compact apparatus, the maintenance of which is low and the power consumption small. The uses of this apparatus are particularly advantageous in the spinning of molten compositions. An important advantage in melt spinning is the fact that less work is done on the molten material than with compression between two pumps thereby reducing the temperature of the pump block and permitting the use of higher temperatures in melting the solid filament-forming composition without raising the temperature of the pump block to a temperature which would promote too rapid decomposition. An outstanding advantage of the invention is the improved yarn strength resulting from the uniform metering of substantially bubble-free filament-forming material by means of the pumps and process of this invention.

Since it is obvious that many changes and modifications can be made in the above-described details without departing from the nature and spirit of the invention, it is to be understood that the invention is not to be limited to the details described herein except as set forth in the appended claims.

I claim:

1. A precision rotary pump adapted to dissolve the bubbles of a viscous bubble-containing liquid and forward the same at a substantially constant rate comprising a rotating member housed in a peripheral wall and between side walls, liquid forwarding gear teeth on said rotating member, liquid inlet and outlet ports in said housing, a frictional drag passage between one of said walls and said rotating member, said passage comprising at least one section and having a total length of at least 0.25 inch with a depth between 0.002 and 0.04 inch, said passage connecting with said inlet port, said passage also connecting with said gear teeth at some point between said inlet and outlet ports.

2. A precision rotary pump adapted to dissolve the bubbles of a viscous bubble-containing liquid and forward the same at a substantially constant rate comprising a rotating liquid forwarding gear housed in a peripheral wall and between side walls, liquid inlet and outlet ports in said housing, a frictional drag passage between one of said walls and the teeth of said rotating gear, said passage comprising at least one section and having a total length of at least 0.25 inch with a depth between 0.002 and 0.04 inch, said passage connecting with said inlet port.

3. A precision rotary pump adapted to dissolve the bubbles of a viscous bubble-containing liquid and forward the same at a substantially constant rate comprising a rotating member housed in a peripheral wall and between side walls, liquid forwarding gear teeth on said rotating member, a cylindrical extension on said rotating member, liquid inlet and outlet ports in said housing, a frictional drag passage between one of said walls and said cylindrical extension, said passage comprising at least one section and having a total length of at least 0.25 inch with a depth between 0.002 and 0.04 inch, said passage connecting with said inlet port, said passage also connecting with said gear teeth at some point between said inlet and outlet ports.

4. A precision rotary pump as defined in claim 1 in which the frictional drag passage is a wedge-shaped passage of gradually decreasing depth in the direction of movement of said rotating member.

5. A precision rotary pump as defined in claim 2 in which the frictional drag passage is a wedge-shaped passage of gradually decreasing depth in the direction of movement of said rotating gear.

6. A precision rotary pump as defined in claim 3 in which the frictional drag passage is a wedge-shaped passage of gradually decreasing depth in the direction of movement of said cylindrical extension.

7. A precision rotary pump adapted to dissolve the bubbles of a viscous bubble-containing liquid and forward the same at a substantially constant rate comprising a rotating liquid forwarding gear housed in a peripheral wall and between side walls, liquid inlet and outlet ports in said housing, a frictional drag passage between said peripheral wall and the teeth of said rotating gear, said passage comprising at least one section and having a total length of at least 0.25 inch with a depth between 0.002 and 0.04 inch, said passage connecting with said inlet port.

8. A precision rotary pump as defined in claim 7 in which the frictional drag passage is a wedge-shaped passage of gradually decreasing depth in the direction of movement of said rotating gear.

9. A precision rotary pump adapted to dissolve the bubbles of a viscous bubble-containing liquid and forward the same at a substantially constant rate comprising a rotating liquid forwarding gear housed in a peripheral wall and between side walls, liquid inlet and outlet ports in said housing, a frictional drag passage between one of said side walls and the teeth of said rotating gear, said passage comprising at least one section and having a total length of at least 0.25 inch with a depth between 0.002 and 0.04 inch, said passage connecting with said inlet port.

10. A precision rotary pump as defined in claim 9 in which the frictional drag passage is a wedge-shaped passage of gradually decreasing depth in the direction of movement of said rotating gear.

11. A precision rotary pump as defined in claim 2 in which the frictional drag passage is comprised of a number of sections.

12. A precision rotary pump as defined in claim 7 in which the frictional drag passage is comprised of a number of sections.

13. The method of metering, in its bubble-free state, a viscous bubble-containing composition which comprises subjecting the composition to a frictional drag of sufficient magnitude to cause solution of the bubbles, and forwarding the bubble-free composition at a constant rate.

14. The method of metering, in its bubble-free state, a viscous bubble-containing composition which comprises subjecting the composition to a frictional drag in a passage comprising at least one section and having a total length of at least 0.25 inch with a depth between 0.002 and 0.04 inch whereby to cause solution of the bubbles, and forwarding the bubble-free composition at a constant rate.

15. The method of metering, in its bubble-free state, a viscous bubble-containing composition which comprises subjecting the composition to a frictional drag in a passage of gradually decreasing cross-section, said passage comprising at least one section and having a total length of at least 0.25 inch with a depth between 0.002 and 0.04 inch whereby to cause solution of said bubbles, and forwarding the bubble-free composition at a constant rate.

16. The method of metering, in its bubble-free state, a viscous bubble-containing composition which comprises subjecting the composition to a frictional drag in a passage having a length of at least 0.25 inch with a depth between 0.002 and 0.04 inch whereby to cause solution of the bubbles, and forwarding the bubble-free composition at a constant rate.

17. The method of metering, in its bubble-free state, a viscous bubble-containing composition which comprises subjecting the composition to a frictional drag of gradually increasing pressure until the bubbles of said composition are dissolved therein, and then forwarding the bubble-free composition, in a positive manner at a constant rate.

18. The method of metering, in its bubble-free state, a viscous bubble-containing composition which comprises continuously dragging said composition into a confined passage with a frictional drag of gradually increasing pressure of sufficient magnitude that the bubbles of said composition are dissolved therein, and then forwarding the bubble-free composition, in a positive manner, at a constant rate.

WINFIELD WALTER HECKERT.

REFERENCES CITED

The following references are of record in the file of this patent:

UNITED STATES PATENTS

| Number | Name | Date |
| --- | --- | --- |
| 1,976,227 | Howard | Oct. 9, 1934 |
| 2,136,142 | Meurling | Nov. 8, 1938 |
| 1,096,186 | Nesmith | May 12, 1914 |
| 1,105,312 | Sundh | July 28, 1914 |
| 2,230,255 | Loumiet et al. | Feb. 4, 1941 |
| 1,751,006 | Kinney | Mar. 18, 1930 |
| 1,626,484 | Smith | Apr. 26, 1927 |
| 1,840,079 | Bradley | Jan. 5, 1932 |
| 246,968 | Matthews | Sept. 13, 1881 |
| 1,631,591 | Hill | June 7, 1927 |
| 1,804,604 | Gilbert | May 12, 1931 |
| 1,129,090 | Hawley | Feb. 23, 1915 |
| 2,130,948 | Carothers | Sept. 20, 1938 |

FOREIGN PATENTS

| Number | Country | Date |
| --- | --- | --- |
| 343,583 | Great Britain | 1931 |
| 40,214 | Denmark | 1929 |
| 2,598 | Great Britain | 1866 |